United States Patent
Bohn, Jr. et al.

(10) Patent No.: US 11,618,282 B2
(45) Date of Patent: Apr. 4, 2023

(54) NON-PNEUMATIC WHEEL HAVING NYLON SPOKE

(71) Applicants: Compagnie Generale des Etablissements Michelin, Clermont-Ferrand (FR); Clayton Bohn, Jr., Mauldin, SC (US); Steven M Cron, Simpsonville, SC (US); Damon Lee Christenbury, Greenville, SC (US); Ryan Michael Gaylo, Simpsonville, SC (US); Timothy Brett Rhyne, Greenville, SC (US)

(72) Inventors: Clayton Bohn, Jr., Mauldin, SC (US); Steven M Cron, Simpsonville, SC (US); Damon Lee Christenbury, Greenville, SC (US); Ryan Michael Gaylo, Simpsonville, SC (US); Timothy Brett Rhyne, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 473 days.

(21) Appl. No.: 16/628,778

(22) PCT Filed: Jul. 6, 2017

(86) PCT No.: PCT/US2017/040958
§ 371 (c)(1),
(2) Date: Jan. 6, 2020

(87) PCT Pub. No.: WO2019/009910
PCT Pub. Date: Jan. 10, 2019

(65) Prior Publication Data
US 2021/0362542 A1 Nov. 25, 2021

(51) Int. Cl.
*B60B 9/26* (2006.01)
*B60C 7/14* (2006.01)
*B60B 5/02* (2006.01)

(52) U.S. Cl.
CPC ............... *B60C 7/146* (2021.08); *B60B 9/26* (2013.01); *B60B 5/02* (2013.01); *B60B 2360/32* (2013.01); *B60B 2900/313* (2013.01)

(58) Field of Classification Search
CPC ......... B60B 9/26; B60B 5/02; B60B 2360/32; B60C 7/146
See application file for complete search history.

(56) References Cited

U.S. PATENT DOCUMENTS

| 4,553,577 A * | 11/1985 | Gregg ..................... B60B 9/26 |
| | | 152/80 |
| 7,013,939 B2 | 3/2006 | Rhyne et al. |
| (Continued) | | |

OTHER PUBLICATIONS

"Vestamid D Polyamide 612 compounds and their characteristics", Evonik, 8 pages, (obtained from https://web.archive.org/web/20130228053900/http:/www.vestamid.com:80/sites/dc/Downloadcenter/Evonik/Product/VESTAMID/en/brochures/VESTAMID%20D%20compounds%20characteristics.pdf) (Year: 2013).*

(Continued)

*Primary Examiner* — Kip T Kotter
*Assistant Examiner* — Emily G. Castonguay
(74) *Attorney, Agent, or Firm* — John Steckler Schwab (57) ABSTRACT

A non-pneumatic wheel includes an outer band, a hub and a plurality of spokes formed from a polyamine material. Each of the plurality of spokes is displaced to create pretension in the radial direction under a design load and the displacement is equal to or greater than the predetermined deflection of the outer band. The plurality of spokes is made from a polyamide material having a conditioned tensile modulus between 600 MPa and 3000 MPa, an equilibrium moisture (Continued)

content of no more than 1.5%, and a fatigue failure resistance that can withstand at least 1 million cycles.

12 Claims, 4 Drawing Sheets

(56) References Cited

U.S. PATENT DOCUMENTS

| | | |
|---|---|---|
| 7,201,194 B2 | 4/2007 | Rhyne et al. |
| 2009/0294000 A1 | 12/2009 | Cron |
| 2010/0132858 A1* | 6/2010 | Arakawa .................. B60B 9/10 152/7 |
| 2013/0233458 A1* | 9/2013 | Meraldi .................... B60B 9/26 152/5 |
| 2014/0083581 A1* | 3/2014 | Schaedler ................ B60B 9/02 152/5 |
| 2016/0280005 A1 | 9/2016 | Cron et al. |

OTHER PUBLICATIONS

International Search Report and Written Opinion dated Apr. 23, 2018.

\* cited by examiner

NON-PNEUMATIC WHEEL HAVING NYLON SPOKE

BACKGROUND OF THE INVENTION

Field of the Invention

This invention relates generally non-pneumatic wheels and more specifically to non-pneumatic wheels having spokes extending between the

Description of the Related Art

The details and benefits of non-pneumatic wheels are described e.g., in U.S. Pat. Nos. 6,769,465; 6,994,134; 7,013,939; and 7,201,194, which are each hereby incorporated herein in their entirety by reference. Some non-pneumatic tire constructions incorporate a shear band, embodiments of which are described in e.g., U.S. Pat. Nos. 6,769,465 and 7,201,194, which are each hereby incorporated herein in their entirety by reference. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (also referred to as "spokes") extending radially from a center element or hub. By way of example, such non-pneumatic wheel may be formed by open cast molding in which a material such as e.g., polyurethane is poured into a mold that forms all or part of the non-pneumatic tire. Alternatively the spokes may be formed individually and then attached to the outer band and hub.

Tension of the spokes is countered by circumferential compression in the outer band of the wheel. The greater the tension of the spokes, the greater the circumferential compression. Uniform spoke tension be created by a uniform pull of each of the spokes. When the wheel is placed under load, such as when it is supporting weight of a vehicle, a portion of the load is carried through circumferential compression forces in the outer band in the circumferential direction to the top of the outer band. The spokes at the top of the wheel carry a larger amount of tension which is proportional to the load applied to the wheel. This load carrying mechanism is similar to how the radial cords of a pneumatic tire carry the load of the vehicle on the top of the rim and is generally referred to as a "top loading wheels."

Bottom loading wheels, such as solid tires, semi-solid tires, foam filled tires or spring wheels, carry a predominant portion of the load in compression against the hub of the wheel.

When a tire encounters an obstacle, such as may be encountered by a tire rolling over a surface that is not smooth or when encountering an obstacle, such as a rock, crack, pothole, or curb, the outer band is momentarily displaced and momentarily deforming the spokes beyond the amount of deformation due to deflection of the outer band in the contact patch. If the spokes have a high stiffness rate, the deformation caused by the obstacle creates a larger load transmitted to the vehicle than if the spokes have a low stiffness rate. The momentary high load created by the obstacle is perceived by the vehicle, and the operator thereof, as noise, vibration, shock, and or impulse, herein referred to as "intrusivity" with increasing intrusivity being associated with increasing noise, and or vibration, etc.

Generally, spoke stiffness increases as the spoke is extended. The slope of the stiffness of the spoke, or the tangent stiffness, compared to the displacement of the spoke, or the amount of deflection of the outer band in the contact patch, will indicate the wheels response to momentary displacements from encountering an obstacle. The greater the slope, the greater the force created as the spoke is displaced while the spoke having a smaller stiffness-displacement slope will exert less force to the vehicle when the tire encounters a momentary displacement.

Spokes constructed of a high modulus material will be stiffer than spokes having a low modulus material. Construction of spokes in traditional non-pneumatic tires from a low modulus material creates non-pneumatic tire spokes having the ability to absorb shock, vibration and reduce noise and impulse forces. Construction of spokes in traditional non-pneumatic tires from high modulus materials creates non-pneumatic tire spokes having stiffer response and a generally higher intrusively.

Using materials having a low modulus to create non-pneumatic tires having low intrusivity require spokes having an actual length which is close to the effective length of the spoke, i.e., the distance between the spoke attachment to the hub and the spoke attachment to the outer band, such that the spokes of the tire are stretched to achieve the appropriate stiffness rate. To reduce the intrusively of the tire, the spokes may be lengthened by lengthening the effective length until the stiffness rate desired is achieved. The effective length, however, is limited by the distance between the hub and the outer band, and in effect is a limiting factor the reduction of intrusivity in the design of a non-pneumatic tire. Complicating the design of the spokes is that while a minimum stiffness is needed in the spokes to support the weight of the vehicle, the stiffness rate of change (tangent stiffness) for the loaded tire increases quickly as the spokes are stretched to support the load. This results in spokes that, although are designed to have a low stiffness, when loaded, have a high stiffness rate (tangent stiffness), particularly when accommodating larger momentary displacements.

Accordingly, a spoke structure that is has a stiffness rate (tangent stiffness) that is sufficiently low to reduce noise, vibration and impulses would be useful. A spoke structure that avoids large localized spoke deformations would also be useful. A spoke structure that also minimizes the effective length needed to achieve a reduction of noise, vibration, shock and or impulses would be particularly helpful.

SUMMARY OF THE INVENTION

Particular embodiments of the non-pneumatic wheels disclosed herein include those having spokes manufactured of a polyamine material. Such embodiments may include a non-pneumatic wheel having a deflection of the outer band in contact patch the under normal loading conditions, the non-pneumatic wheel defining an axis of rotation and defining axial, radial, and circumferential directions, the non-pneumatic wheel comprising an outer band, the outer surface of the outer band having a ground contacting surface, a hub, and a plurality of spokes.

Each of the plurality of spokes is displaced to create pretension in the radial direction under a design load and the displacement is equal to or greater than the predetermined deflection of the outer band.

In particular embodiments the plurality of spokes is made from a polyamide material having a conditioned tensile modulus between 600 MPa and 3000 MPa as determined under ISO-527-2, an equilibrium moisture content of no more than 1.5% as determined at 23° C. and 50% relative humidity under ISO 62 and a fatigue failure resistance that can withstand at least 1 million cycles as determined under ASTM D7774.

In particular embodiments the plurality of spokes may each possess a v-shaped geometry and may further be nested with the adjacent spoke such that the nose of the spoke extends past a vertical line drawn between the connection point of the adjacent spoke with the hub and the connection point of the adjacent spoke with the outer band.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention include non-pneumatic wheels having a plurality of spokes that extend between its hub and its outer ring. The outer ring supports an outer band having the tread, which is, as is known, the surface that engages the ground. Each of the plurality of spokes is placed in the non-pneumatic wheel in a state of pretention since it has been found that such a non-pneumatic wheel, having spokes formed of a suitable material, improves the intrusivity characteristics of the non-pneumatic wheel. The non-pneumatic wheels disclosed herein are useful for a wide range of applications including, for example, slow moving vehicles such as golf carts, lawn mowers, front-end loaders and other similar slow-moving heavy vehicles. However particular embodiments are directed to fast moving vehicles such as automobiles and/or other vehicles that generally are found on highways since the non-pneumatic wheels disclosed herein provide improved intrusivity characteristics as are desired for fast moving vehicles such as automobiles.

As will be further explained below, particular embodiments of the non-pneumatic wheels disclosed herein have an amount of pretention in the spokes that is at least equal to or greater than the amount of deflection that the non-pneumatic wheel undergoes when placed under its designated Design Load. Such designated Design Load is determined by the manufacturer and is typically indicated on the sidewall of the non-pneumatic wheel. It is, as those skilled in the art understand, the maximum load at which the non-pneumatic wheel is expected and/or is designed to operate.

The material from which the plurality of spokes is manufactured is a high rigidity material. In addition to the non-pneumatic wheels disclosed herein having spokes that are set in pretention, it has been found that intrusivity characteristics of the non-pneumatic wheels disclosed herein are improved when such spokes are made of high rigidity materials. In particular embodiments, though not meant to limit the invention only to this material, some nylons or polyamides have been found to be suitable materials for forming the spokes.

More particularly and as is further discussed below, a suitable polyamide is one having a conditioned tensile modulus of between 600 MPa and 3000 MPa as determined by ISO-527-2, an equilibrium moisture content of no more than 1.5% as determined at 23° C. and 50% relative humidity by ISO 62 and a fatigue failure resistance that can withstand at least 1 million cycles as determined by ASTM D7774, a three-point bend test at 23° C. with 2% strain at 10 Hz. Such polyamides provide spokes that have suitable physical characteristics that include, for example, fatigue resistance and/or creep resistance. Examples of suitable polyamides include selections from PA12, PA11 and PA612 polyamides.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the shear band and/or wheel structure.

"Radial plane" means a plane that passes perpendicular to the equatorial plane and through the axis of rotation of the wheel.

"Design Load" means the maximum load at which the non-pneumatic wheel is expected and/or is designed by the manufacturer to operate and is typically displayed on the sidewall of the wheel.

"Delta stiffness" means the slope of the line drawn on a plot of force over displacement, with the slope measured from a position where the object is unstressed and exerting no force, to the position where the object is exerting the force from which the stiffness is calculated by dividing the force by the displacement.

"Tangent stiffness" means the slope of the line drawn on a plot of force over displacement where the slope is measured by the change in force divided by the change in displacement. In other words, the tangent slope is the slope of a line that is drawn tangent to line drawn of a plot of force over displacement for the object at a given location on the force over displacement line.

Figure 1:
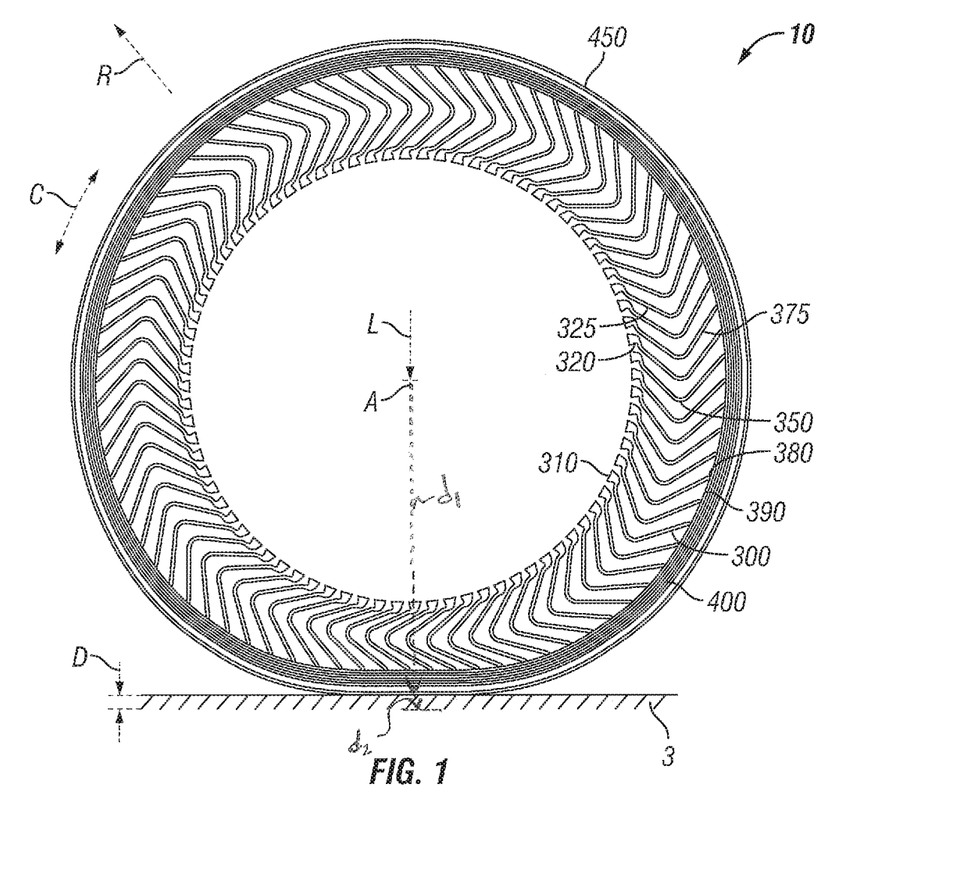
FIG. 1 provides a side view of an embodiment of the outer portion of non-pneumatic tire having a high degree of spoke curvature.

FIG. 1 provides a side view of an embodiment of the outer portion of non-pneumatic wheel having a high degree of spoke curvature. The wheel 10 shown here is resting on a surface 3. A load L is applied to the hub of the wheel, which could represent the weight, or a portion thereof, of the vehicle. When the load L is applied, the wheel is pressed against the surface 3 and the outer band deflects a distance D. Expressed another way, the outer band deflection D is the difference between a first radial length $d_2$ between the axis centerpoint of the wheel and a radially outermost point on the outer band in an unloaded state and a second radial length $d_1$ between the axis centerpoint and the radially outermost point on the outer band in the center of the contact patch. When the load L is equal to the Design Load, then the outer band deflection is the outer band deflection at design load $D_{DL}$. The area of contact is referred to as the "contact patch" and, as is known by those skilled in the art, provides an area over which the wheel interfaces and reacts with the surface on which it travels.

When viewed from the axial side of the wheel, in particular embodiments the spoke 300 possess a V-shaped geometry. This geometry allows for a linear stiffness when deflected radially over a distance approximately equal to the deflection $D_{DL}$. This characteristic results in improved intrusivity properties since comparatively lower force transmission occurs through the wheel during a dynamic loading event, such as when the wheel 10 encounters an obstacle such as a crack, rock or curb in the road, than with non-pneumatic wheels having spokes possessing less curvature, i.e., a spoke having an actual length closer to the effective length.

In particular embodiments, the V-shaped geometry of the spoke begins at the attachment point 380 of the spoke to the outer band 400. A radially outer portion 375 of the spoke 300 extends radially inward and circumferentially in a clockwise direction. The spoke then curves forming a radiused nose 350. The radially inner portion 325 continues in a radially inward and circumferentially in a counter-clockwise direction to hub attachment point 320 which may possess a dovetail thickened portion 310 for engagement with a fastener.

The spoke's V-shaped geometry allows the spoke 300 to nest with each adjacent spoke 300 on either side of it, preventing the spokes from clashing into each other during normal operating conditions, such as rolling under the intended design loading conditions for the wheel. The nesting enables the nose of the spoke to extend circumferentially past a straight line drawn between the connection point of an adjacent spoke with the hub and the connection point of the adjacent spoke with the outer band.

In the embodiment shown here, the spokes 300 are integrally formed with an outer ring 390 which is attached to the outer band 400. Alternatively the spokes may be formed individually and bonded individually with the outer band 400.

Figure 2:
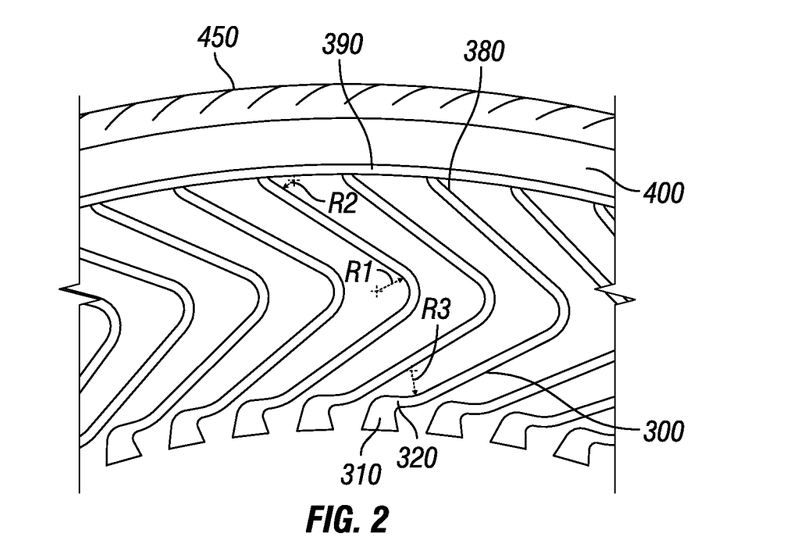
FIG. 2 provides a partial enlarged side view of the outer portion of the non-pneumatic tire with the spokes in a relaxed neutral state.

FIG. 2 provides a partial enlarged side view of the outer portion of the non-pneumatic wheel 10 with the spokes 300 in a relaxed neutral state. The outer band 400 of the wheel possesses a tread 450. The relaxed neutral state is the position that the spokes would assume when they are disconnected from the hub, or in other words, when the spokes have no pretension applied to the spokes. The spokes may possess a dovetail portion 310 at the radially inner portion of the spoke. The radially inner portion of the spoke extends out in a circumferential direction from the dovetail 310 at the connection point 320 with the dovetail. After a radiused bend R3, the spoke extends to a nose portion 350 which in this embodiment possesses a radius R1. The radius R1 reduces bending stresses as compared to a sharp v-shaped nose. The spoke then extends from the nose portion 350 to the radially outer connection point 380 which then, after another radiused bend R2 of this embodiment, joins to the outer ring 390 which is attached with the outer band 400.

Figure 3:
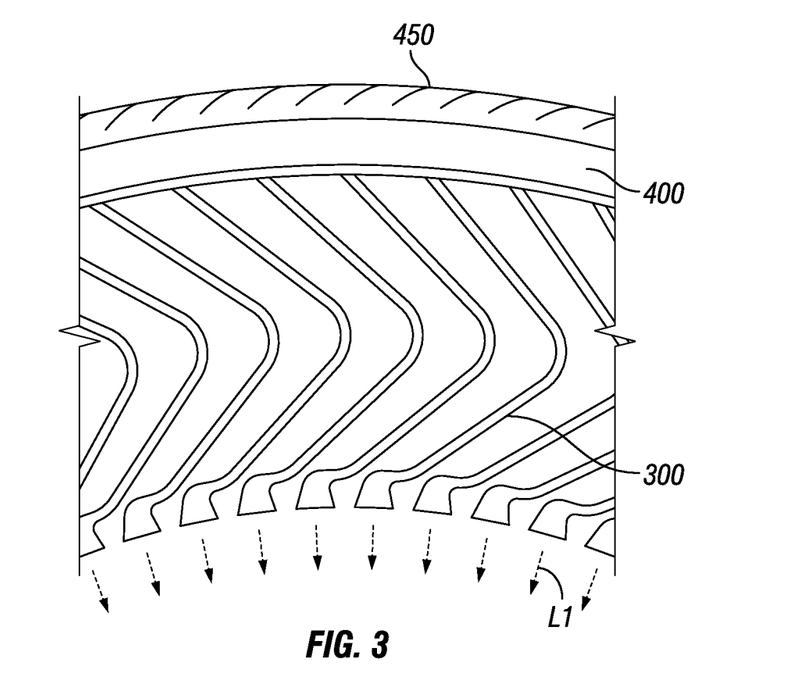
FIG. 3 provides a partial enlarged side view of the outer portion of the non-pneumatic tire with the spokes in a tensioned state as they would be when connected to the hub portion of the tire.

FIG. 3 provides a partial enlarged side view of the outer portion of the non-pneumatic wheel 10 with the spokes 300 in a tensioned state as they would be when connected to the hub portion of the wheel. Here a force L1 is applied to the radially inner end of the spokes 300 extending the spokes radially inward toward the central axis of the wheel 10. When the spoke 300 is attached to the hub 100, the radial displacement of the spoke creates the pretension L1. In particular embodiments of the non-pneumatic wheels disclosed herein, the radial displacement due to pretension should be greater than the amount of deflection D the wheel undergoes during normal operation in the contact patch. It is anticipated, however, that a dynamic loading event may cause the spoke to momentarily compress past its neutral state.

Figure 4:
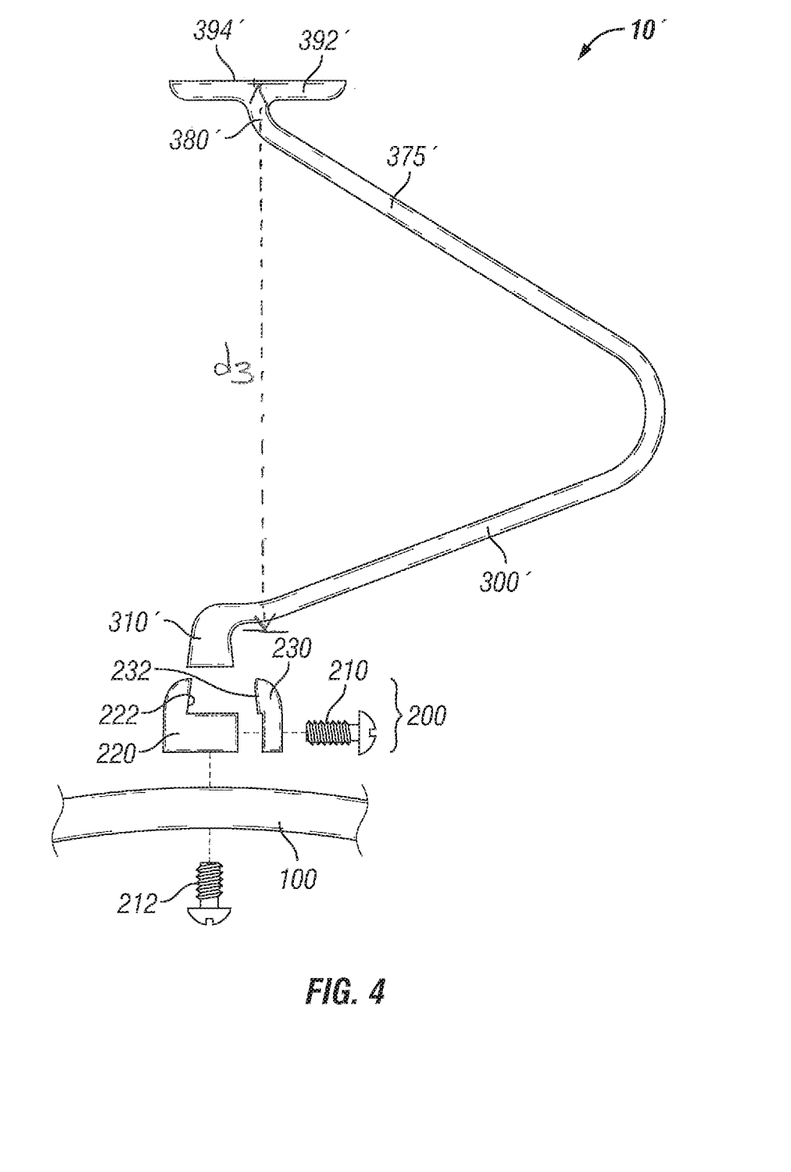
FIG. 4 provides an enlarged partial perspective view of a single spoke, fastener assembly and a portion of the hub of an embodiment of the non-pneumatic tire.

FIG. 4 provides an enlarged partial perspective view of an alternative embodiment of a single spoke 300', fastener assembly 200 and a portion of the hub 100 of an embodiment of a non-pneumatic wheel 10'. Here the hub 100 is shown attached to the spoke 300' by a fastener assembly 200. The fastener assembly creates a slot which clamps on to the dovetail portion 310' of the spoke. The fastener assembly 200 includes an L-shaped bracket 220, a bracket plate 230 and at least one faster fastener 210. Here a plurality of screw fasteners 210 retain the bracket plate 230 onto the L-shaped bracket 220 which impinge the dovetail portion 310' of the spoke 300' by clamping it with the inner surfaces 222, 232 of the bracket.

The radially outer portion 375' of the spoke 300' possesses a T-shaped radially outer end 392' which provides an attachment point 380' with a surface 394' that is attached to the outer band 400. In the embodiment shown, the radially outer surface 394' of the spoke 300' is bonded with an adhesive chosen depending upon the materials used for the outer band and spoke 300'.

Figure 5:
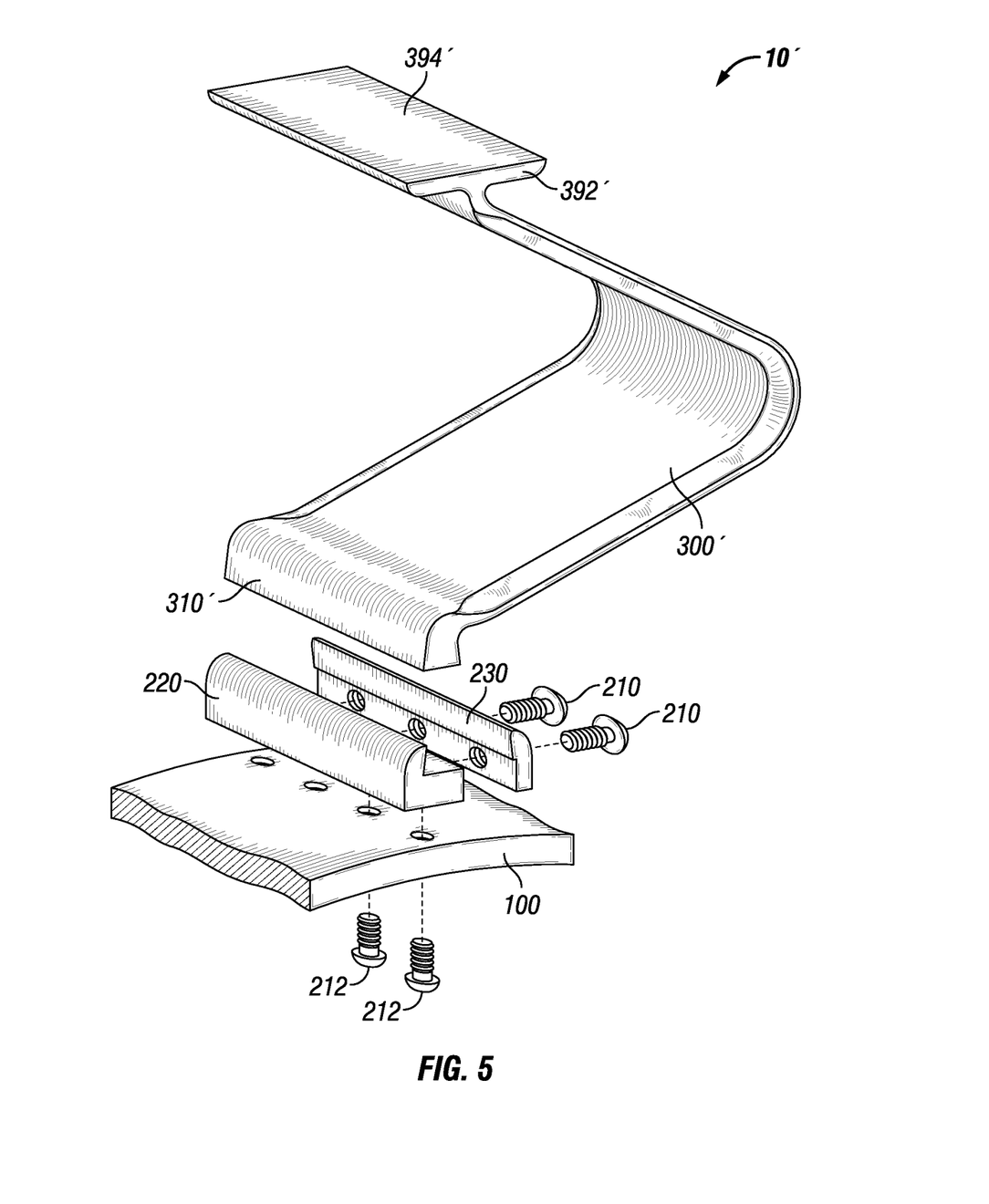
FIG. 5 provides an enlarged partial perspective view of a single spoke, fastener assembly and a portion of the hub of an embodiment of the non-pneumatic tire.

FIG. 5 provides an enlarged partial perspective view of the single spoke 300', fastener assembly 200 and a portion of the hub 100 of the embodiment of the non-pneumatic wheel 10'. A plurality of fasteners 212 retains the L-shaped bracket 220 to the hub 100. Likewise, a plurality of fasteners 210 retains the bracket plate 230 to the L-shaped bracket 220 and provide impinging force to retain the thickened radially inner end 310' of the spoke 300'. Alternative embodiments, not shown, may possess thickened shapes other than a dovetail or triangular shape as shown for the thickened radially inner end 310', such as a circular shape or rectangular shape. Alternative embodiments may also retain the spoke by sliding the thickened radially inner end 310' of the spoke into a corresponding slot in the hub, the slot being appropriately sized to accommodate and retain the thickened radially inner end of the spoke 300'.

The low spring rate of the spoke, and high pretension allow for a tangent stiffness that is lower than the tangent stiffness of a similarly sized non-pneumatic wheel constructed with spokes that possess less curvature. Here, the circumferentially elongated spoke curvature allows the outer band to displace vertically over a greater distance without generating as great of a reaction force in the spokes at the top of the wheel than would occur if the spokes were shorter. In the embodiments shown, the spokes have a circumferential length, as measured from the circumferential distance from a line drawn between the connection to the hub and connection to the outer band to the front of the nose of the spoke which is at least 75 percent of that of the distance of the uncompressed (neutral) height of the spoke, the uncompressed height $d_3$ being measured between the connection point to the hub and the connection to the outer band of the spoke in a neutral, unloaded, state. In the embodiment shown in FIGS. 4 and 5, the circumferential length is at least 80% of that of the uncompressed height of the spoke. When pulled into tension, the circumferential length of the spoke is at least 25% that of the tensioned height, when pretension is applied. That is to say, the circumferential length of the spoke decreases from at least 75% of the uncompressed height of the spoke in a neutral, unloaded state to at least 25% of the tensioned height of the spoke in the tensioned state.

Surprisingly increasing the modulus of a spoke material allows the creation of a spoke having a lower, and linear, tangent stiffness. This is accomplished in part by applying a pretension to the spokes such that the displacement of the spokes from a neutral position is equal to or greater than the displacement of the wheel's contact patch. The pretension also maintains the top loading nature of the wheel, allowing the wheel to carry the load by the spokes in tension unlike previously attempts at bottom loading spring wheels.

In particular embodiments of the non-pneumatic wheels disclosed herein, polyamide materials are useful high modulus materials for making the plurality of spokes. More particularly, suitable polyamide materials include those having a conditioned tensile modulus of between 600 MPa and 3000 MPa as determined by ISO-527-2, an equilibrium moisture content of no more than 1.5% as determined at 23° C. and 50% relative humidity by ISO 62 and a fatigue failure resistance that can withstand at least 1 million cycles in accordance with ASTM D7774. The conditioned tensile modulus is measured after the sample has been conditioned at 23° C. and 50% relative humidity.

The conditioned tensile modulus may alternatively range between 800 MPa and 3000 MPa, between 800 MPa and 2500 MPa, between 1000 MPa and 3000 MPa, between 1000 MPa and 2500 MPa, between 800 MPa and 2000 MPa or between 1000 MPa and 1500 MPa or between 850 MPa and 1500 MPa. It is noted that for particular embodiments, the thickness of the plurality of spokes may be adjusted based on the tensile modulus of the polyamide material, lower tensile modulus spokes being thicker than higher tensile modulus spokes for the same conditions.

As is known in the art, nylon is a generic term for certain polyamide polymers and therefore they are often designated by PA, such as PA 12, PA 11, PA 6 and so forth. Polyamide, or nylon, is a thermoplastic material and is used in a wide range of applications including, for example, fibers, fabrics, molded automobile parts and food wrapping films. Polyamides are typically made by reacting monomers such as lactams (cyclic amides), acid/amines (amino acids) or stoichiometric mixtures of diamines and dicarboxylic acids to form the polyamide polymeric materials.

The high modulus polyamide materials for forming the plurality of spokes are determined to be useful from their conditioned tensile modulus. It is known that polyamide is a material that may readily absorb moisture from its surroundings and when absorbed, the moisture lowers the polyamide's strength and stiffness. Therefore the selection of suitable polyamide materials was based upon their conditioned tensile modulus and not their dry-as-molded tensile modulus. The conditioned tensile modulus is determined on test samples that have been conditioned in accordance with ISO 62 at 50% relative humidity and at 23° C. The amount of moisture that is absorbed by the polyamide materials, in wt %, may also be measured in accordance with ISO 62 at 50% relative humidity and at 23° C.

Since the material properties of the polyamide change with moisture content, suitable polyamide materials are those that have an equilibrium moisture content of no more than 1.5% or alternatively no more than 1.3% or no more than 1%. If the polyamide materials absorb moisture in higher amounts, the spokes may have tensile modulus properties that vary too greatly based on their operating environment, i.e., a desert versus a tropical environment where the relative humidity is vastly different.

Particular embodiments of the plurality of spokes for the non-pneumatic wheel disclosed herein must be able to withstand a high number of flexures without failure since each spoke will be flexed each time the spoke enters the contact patch. Therefore suitable polyamide materials include those that can withstand at least 1 million cycles as determined by ASTM D7774, a three-point bend test at 23° C. with 2% strain at 10 Hz. Alternatively the polyamide materials must withstand at least 5 million cycles, at least 8 million cycles, at least 12 million cycles, at least 20 million cycles or at least 25 million cycles.

In addition to the physical properties of fatigue, conditioned tensile modulus and water absorption discussed above relevant to useful polyamide materials, particular embodiments of the plurality of spokes as disclosed herein may include polyamide materials further described as having a density of not more than 1.10 g/cm$^3$ at 23° C. as determined by ISO 1183. The density is that of dry polyamide materials, not the density of conditioned polyamide materials.

Examples of useful polyamide materials that meet the above criteria for physical properties include PA 12 polyamides, PA 11 polyamides and PA 612 polyamides. Any one of these polyamides may be used individually in particular embodiments of the non-pneumatic wheels disclosed herein or in combinations of two or more in other embodiments.

As is known in the art, PA 12 or nylon 12 is a polymer with the formula $[(CH_2)_{11}C(O)NH]_n$ and may be manufactured typically either through polycondensation of w-aminolauric acid, which is a bifunctional monomer with one amine and one carboxylic group, or through the ring-opening polymerization of laurolactam. Each of these monomers has 12 carbons that give nylon 12 its name. An example of a commercially available nylon 12 that is suitable for the manufacture of the plurality of spokes is GRILAMID L20 produced by EMS-Grivory.

PA 11 or nylon 11 is a polyamide polymer with the formula $[(CH_2)_{10}C(O)NH]_n$ and is manufactured from the polycondensation of 11-aminoundecanoic acid, which is a bifunctional monomer with one amine and one carboxylic group and is an oil of the castor bean. An example of a commercially available nylon 11 that is suitable for the manufacture of the plurality of spokes is RILSAN produced by Arkema.

PA 612 polyamide is a copolymer well known in the art to be a copolymer of a 6-carbon diamine and a 12-carbon diacid, namely it is the polycondensation product of 1,6-hexamethylene diamine and 1,12-dodecanedioic acid. Examples of commercially available nylon 612 that are suitable for the manufacture of the plurality of spokes include VESTAMID DX9302 and VESTAMID DX9304 produced by Evonik.

Table 1 provides the physical characteristics of these suitable nylon materials.

TABLE 1

Examples of Suitable Polyamide Materials

|  | GRILAMID L20 | RILSAN | VESTAMID DX9302 | VESTAMID DX9304 |
|---|---|---|---|---|
| Tensile Modulus[1], MPa | 1100 | 1320 | 850 | 1200 |

TABLE 1-continued

Examples of Suitable Polyamide Materials

|  | GRILAMID L20 | RILSAN | VESTAMID DX9302 | VESTAMID DX9304 |
|---|---|---|---|---|
| Fatigue[2,3], $10^6$ cycles | >8 | unavailable | >8 | >8 |
| Water absorption[4], % | 0.7 | 0.8 | 0.5 | 1.0 |
| Density[5], g/cm³ | 1.01 | 1.03 | 1.02 | 1.04 |

[1]Conditioned tensile modulus at 23° C. and 50% relative humidity determined under ISO 527-2
[2]Fatigue measured at 23° C. determined under method providing similar results to ISO XXXXW
[3]Testing stopped at >8 million cycles with no indication of failure
[4]Water absorption measured at 23° C. and 50% relative humidity in accordance with ISO 62
[5]Density of dry polyamide product measured at 23° C. in accordance with ISO 1183

Alternatively there were several examples of polyamide materials that were not suitable for manufacturing the plurality of spokes for the non-pneumatic wheel disclosed herein. Without expressing a reason to explain the failure of some of these polyamide materials, it may be noted that at least some of them had excellent physical characteristics other than that they were unable to meet the fatigue resistance specification. Others were not suitable because they failed to meet the water absorption specification.

For example, PA 6, PA 66 and PA 46 materials were not suitable polyamides since they had a water absorption property that was too high. With the high water absorption, the difference in the tensile modulus between the conditioned and dry measurements was too great, which would impact the performance of the non-pneumatic wheel under different operating environmental conditions, such as, for example, a tropical operating environment with a high relative humidity and a desert operating environment with a low relative humidity.

PA 6, as is well known in the art, is a polymer typically formed by ring opening polymerization of caprolactam, a six-carbon ring. Since PA 6 is the result of a polymerization reaction of the 6-carbon ring, it is named PA 6. PA 66 is the polycondensation reaction of hexamethylenediamine and adipic acid, which is hexanedioic acid, and is therefore the polymerization product of a six carbon diamine with a six carbon diacid. PA 46 is the product of the polycondensation reaction of 1,4-butanediamine with adipic acid and is therefore the polymerization product of a four carbon diamine with a six carbon diacid.

Table 2 provides the physical characteristics of examples of these polyamides that are not suitable for manufacturing the plurality of spokes since they have water absorption rates that are too high, as measured by ISO 62 as well as higher-than-desired densities as measured by ISO 1183. GRILON polyamides are available from EMS-Grivory and the STANYL polyamides are available from DSM, with headquarters in the Netherlands.

TABLE 2

Physical Properties of Selected Polyamides

|  | GRILON AS/2 | GRILON BS | STANYL HGR1 |
|---|---|---|---|
| Polyamide Type | PA66 | PA6 | PA46 |
| Tensile Modulus, MPa | 1700 | 1000 | 1200 |
| Density, g/cm³ | 1.14 | 1.13 | 1.18 |
| Water absorption, % | 2.0 | 3.0 | 3.2 |

The testing procedures were the same as those for the properties shown in Table 1. Even though the conditioned tensile moduli shown in Table 2 for these selected polyamides were suitable, these polyamides were not suitable due to their high water absorption property and their higher-than-desired density. While these polyamides are widely used in many applications for polyamides, they are not useful for manufacturing the plurality of spokes for the non-pneumatic wheels disclosed herein.

There is another class of polyamides that are also not suitable materials. These polyamides include materials that are amorphous, transparent polyamides that have a high Tg but fail the fatigue resistance specification. While these materials have excellent conditioned tensile moduli and acceptable densities, they are not suitable nylons since they are not fatigue resistant.

One example of such material is a PA12/MACMI copolymer and a PA12/MACM copolymer. Examples of these materials are produced by EMS-Grivory under the trade names GRILAMID TR55 and GRILAMID TR90 respectively. PA12/MACMI is a copolymer of laurolactam with 3,3'-dimethyl-4,4'-diamino-dicyclohexylmethane and isophthalic acid. PA12/MACM is a copolymer of just 3,3'-dimethyl-4,4'-diamino-dicyclohexylmethane and dodecanedioic acid.

Table 3 provides the physical characteristics of these polyamides that are not suitable for manufacture of the plurality of spokes due to their poor fatigue failure resistance properties. The testing procedures were the same as those for the properties shown in Table 1.

TABLE 3

Selected Polyamides Properties

|  | GRILAMID TR55 | GRILAMID TR90 |
|---|---|---|
| Polyamide Type | PA12/MACMI | PA12/MACM |
| Tensile Modulus, MPa | 2200 | 1600 |
| Density, g/cm³ | 1.06 | 1.00 |
| Water absorption, % | 1.5 | 1.5 |
| Fatigue, cycles | <30,000 | <507,000 |

By creating spokes forming the plurality of spokes individually, such as shown in the spoke embodiment 300' above, the spokes may be injection molded from the suitable polyamides disclosed herein.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A non-pneumatic wheel defining an axis of rotation and defining axial, radial, and circumferential directions, the non-pneumatic wheel comprising:
    an outer band, the outer band having a contact patch corresponding to a ground contacting surface, and the outer band having, during operation, a predetermined deflection of the outer band in the contact patch;
    a hub; and
    a plurality of spokes,
    wherein each spoke is mounted having a displacement corresponding to the change in distance between a radially inner portion and a radially outer portion of each spoke under the design load of the wheel, the displacement equal to or greater than the predetermined deflection of the outer band, wherein the plurality of spokes is made from a polyamide material having a conditioned tensile modulus between 600 MPa and 3000 MPa as determined under ISO-527-2, an equilibrium moisture content of no more than 1.5% as determined at 23° C. and 50% relative humidity under ISO 62 and a fatigue failure resistance that can withstand at least 1 million cycles as determined under ASTM D7774
    wherein said plurality of spokes have a linear stiffness through displacement to the design loading conditions of the wheel.

2. The non-pneumatic wheel of claim 1, wherein the plurality of spokes each possess a v-shaped geometry.

3. The non-pneumatic wheel of claim 2, wherein each of the plurality of spokes comprise a nose and each of the plurality of spokes nests with the adjacent spoke such that the nose of the spoke extends past a vertical line drawn between a connection point of the adjacent spoke with the hub and a connection point of the adjacent spoke with the outer band.

4. The non-pneumatic wheel of claim 1, wherein the displacement of the spoke is the displacement measured between a neutral state of the spoke and the state where the plurality of spokes are attached to the hub and the outer band with the wheel not subject to a load, wherein the neutral state of the spoke is the shape the spoke assumes when the spoke is detached from the hub and the outer band.

5. The non-pneumatic wheel of claim 1, wherein the deflection of the outer band is a measurement of the difference between a first length between the axis of rotation of the wheel and a point on outer band in an unloaded state and a second length between the axis of rotation of the wheel and the point on outer band in a loaded state, such measurement measured at a contact patch midpoint.

6. The non-pneumatic wheel of claim 1, wherein each of the plurality of spokes has a circumferential length in a neutral state that is at least 75 percent of a neutral height of the spoke.

7. The non-pneumatic wheel of claim 6, wherein the circumferential length of each of the plurality of spokes has the circumferential length in a tensioned state that is at least 25 percent of that of a tensioned height of the spoke.

8. The non-pneumatic wheel claim 1, wherein the spokes having a v-shaped geometry such that each spoke has a linear stiffness when deflected radially over a distance approximately equal to the deflection of the outer band at the design load.

9. The non-pneumatic wheel of claim 1, wherein the conditioned tensile modulus of the polyamide material is between 1000 MPa and 2000 MPa.

10. The non-pneumatic wheel of claim 1, wherein the fatigue failure resistance of the polyamide material can withstand at least 8 million cycles.

11. The non-pneumatic wheel of claim 1, wherein a density of the polyamide material is not more than 1.10 g/cm$^3$ as determined under ISO 1183 at 23° C.

12. The non-pneumatic wheel of claim 1, wherein the polyamide is selected from the group consisting of a PA 12, a PA 11, a PA 612 and combinations thereof.

* * * * *